United States Patent
Grosch et al.

(10) Patent No.: US 9,405,644 B2
(45) Date of Patent: Aug. 2, 2016

(54) REDUNDANT AUTOMATION SYSTEM

(71) Applicant: Siemens Aktiengesellschaft, Munich (DE)

(72) Inventors: Thomas Grosch, Roβtal (DE); Jürgen Laforsch, Bühl (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 14/503,659

(22) Filed: Oct. 1, 2014

(65) Prior Publication Data
US 2015/0095690 A1    Apr. 2, 2015

(30) Foreign Application Priority Data

Oct. 1, 2013    (EP) .................................... 13186804

(51) Int. Cl.
*G06F 11/00* (2006.01)
*G06F 11/20* (2006.01)
*G05B 19/05* (2006.01)

(52) U.S. Cl.
CPC .......... *G06F 11/2097* (2013.01); *G05B 19/058* (2013.01); *G06F 11/2023* (2013.01); *G05B 2219/14129* (2013.01); *G05B 2219/14131* (2013.01)

(58) Field of Classification Search
CPC ........................ G06F 11/2023; G05B 19/058
USPC ................ 714/3, 4.1, 4.12, 4.2, 4.21, 4.3, 4.4
See application file for complete search history.

(56) References Cited

U.S. PATENT DOCUMENTS

| | | | | |
|---|---|---|---|---|
| 5,809,543 A | * | 9/1998 | Byers | G06F 11/1666 711/120 |
| 6,061,600 A | * | 5/2000 | Ying | G05B 9/03 700/3 |
| 6,147,967 A | * | 11/2000 | Ying | G06F 11/2242 370/222 |
| 6,356,795 B1 | | 3/2002 | Fuchs | |
| 2003/0214953 A1 | * | 11/2003 | El-Demerdash | H04L 12/403 370/400 |
| 2005/0020279 A1 | * | 1/2005 | Markhovsky | G01S 5/12 455/456.1 |

FOREIGN PATENT DOCUMENTS

| DE | 19625195 A1 | 1/1998 |
|---|---|---|
| EP | 1291744 A2 | 3/2003 |

OTHER PUBLICATIONS

Siemens-Catalog ST 70, Chapter 6, Edition 2013.

* cited by examiner

*Primary Examiner* — Dieu-Minh Le
(74) *Attorney, Agent, or Firm* — Cozen O'Connor

(57) ABSTRACT

A redundant automation system having a plurality of automation devices which are connected to one another comprises a plurality of master devices and a slave device. Each of the plurality of automation devices processes a control program in order to control a technical process. At least one of the plurality of automation devices operates as a slave and at least two of the plurality of automation devices, each operates as a master. The plurality of master devices is each configured to run a respective master program and to process processing sections of the respective master program of the respective master program, and the slave device is configured to process a corresponding slave control program for each master control program run by the plurality of master devices and, if one of the plurality of master devices fails, to assume the function of the failed master.

8 Claims, 6 Drawing Sheets

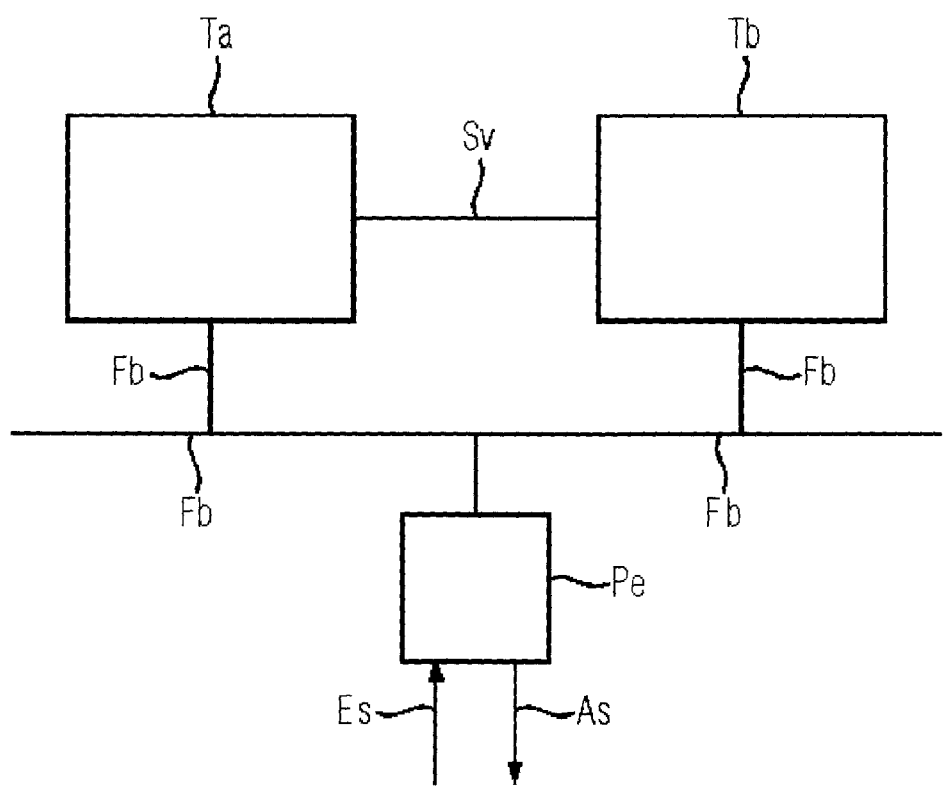

REDUNDANT AUTOMATION SYSTEM

FIELD OF INVENTION

The invention relates to a redundant automation system having a plurality of automation devices that are connected to one another, wherein each of the plurality of automation devices processes a control program in order to control a technical process.

DESCRIPTION OF THE RELATED ART

In the automation environment, there is an increasing demand for highly available solutions (e.g., H systems) which are suitable for minimizing possible downtimes of the installation. The development of such highly available solutions is very cost-intensive with an H system usually used in the automation environment being distinguished by the fact that two or more subsystems in the form of automation devices or computer systems are coupled to one another via a synchronization connection. In principle, both subsystems can have read and/or write access to the peripheral units connected to this H system. One of the two subsystems leads with respect to the peripherals connected to the system. This means that outputs to peripheral units or output information for these peripheral units is/are effected only by one of the two subsystems which operates as a master or has assumed the master function. For both subsystems to run in a synchronous manner, the subsystems are synchronized at regular intervals via the synchronization connection. With respect to the frequency and extent of synchronization, different forms (warm standby, hot standby) may be used.

An H system often requires a smooth "failover" if one of the subsystems fails and it is necessary to change over to the other subsystem. This means that, despite this unplanned changeover or this unplanned change from one subsystem to the other, this changeover or change does not have a disruptive effect on the technical process to be controlled. In this case, it is permissible for a (short) dead time, during which the outputs remain at their last valid process output values, to occur at the outputs of the connected peripherals. However, a jump (surge) in the values at these outputs on account of the changeover is undesirable and should therefore be avoided. Therefore, "smooth" should also be understood to mean the continuity of the curve shape of the process output values.

In order to achieve this, the two subsystems must have the same system state at the time of the failure. This is ensured using the suitable synchronization method. If both subsystems are processing the input information (inputs) of the process, both systems are in the same system state when they change their respective "thread global" data (shared data of programs, in particular programs with different priorities) in the same manner given the same process input data or process input information. In order to achieve this, the synchronization method ensures that the individual threads of the two subsystems are interrupted or executed in the same manner. This results in an identical "thread mountain".

The Siemens catalog ST 70, chapter 6, 2013 edition, discloses a redundant automation system which comprises two subsystems (a master PLC and a slave PLC) and is intended to increase the availability of an installation to be controlled. For this purpose, the automation system is provided with device/apparatus that decides, on the basis of an event, which program must be started in order to suitably react to the event. If, for example during the execution of a program, an event in the form of a pending alarm for the technical process to be controlled is applied to a signaling input of the automation system, the running program is usually stopped at a waiting point and a program which is intended to analyze the alarm and initiate measures which eliminate the cause of the alarm is started. This automation system is regularly synchronized and it is ensured that the failure of one of these subsystems does not have a disruptive effect on a process to be controlled because the other subsystem can continue the execution or processing of the corresponding part of its respective control program or the execution or processing of the corresponding parts of this control program.

If, for example, an event which has occurred in a first subsystem is not synchronized with a second subsystem of an automation system comprising two subsystems and, after the event has been processed by the first subsystem, this subsystem fails, the course of a technical process to be controlled may be disrupted. This is because the second subsystem—without knowledge of the event—runs through a different program path, representing the execution order of the programs, from the program path which would be run through by the second subsystem with knowledge of the event and which would also be necessary in order to avoid disrupting the course of the technical process to be controlled.

It is pointed out that a program is understood to mean both a program and a subroutine, a part of a program, a task, a thread, an organizational module, a functional module or another suitable program code for implementing an automation function. The programs of an automation system usually is categorized into priority classes and processed or executed according to their associated priority.

A slave automation device (backup PLC) is usually respectively provided for each master automation device (master PLC) in a redundant automation system as a redundancy partner, i.e., 2n slave automation devices are required for n master automation devices, which means a very large amount of hardware. Such an automation system is cost-intensive and the planning of such an automation system is also very complex.

SUMMARY OF THE INVENTION

Therefore, the invention is based on an object of providing an automation system of the type mentioned at the outset which can be used to achieve redundancy with a reduced amount of hardware. This object is achieved by the features of described/recited in the claimed invention.

It is advantageous that (hot standby) redundancy can also be subsequently achieved in a simple manner. Redundancy need not necessarily comprise all masters (master automation devices, master PLCs) of the automation system. It is possible to select only a particular number of master PLCs which are operated in a redundant manner using a backup PLC. On account of the small amount of hardware, the failure rate (MTTF) of the automation system is reduced with regard to a 2n solution in comparison with the prior art. If one of the master PLCs fails, the backup PLC assumes the function of this master PLC. The slave control program assigned to this master PLC in the backup PLC becomes the master control program and carries out the control tasks of this failed master PLC. This failover is effected smoothly for any potentially defective master PLC, in which case the failure of all master PLCs is safeguarded by the backup PLC.

The master PLCs do not have to (actively) wait for a response from the slave or the backup automation device (backup PLC) in order to continue their program processing: all relevant information is transmitted from the masters to the slave in a temporally asynchronous manner. As a result, the processing performance of the masters is decoupled from the communication bandwidth available for event synchronization, which is important, in particular, with regard to the increasing imbalance between the increase in the processing performance of the processors, on the one hand, and the increase in the communication performance, on the other hand. This is because the communication performance usually cannot keep up with the increasing processing performance.

After events have occurred, each master is synchronized with the slave such that both the masters and the slave run through the same program paths on account of the events, the runs being effected in a temporally asynchronous manner. This means that the masters temporally lead the slave or the slave temporally trails the masters with regard to the program processing. In this context, "trailing" or "leading" of the slave with respect to one of the masters is understood as meaning the time difference between the beginning of the processing of the processing sections by this master and the beginning of the processing of the processing sections by the slave.

A corresponding situation also applies if different HW platforms with different performance are provided for the masters and the slave (reserve). On account of the asynchronous coupling of the masters and the slave, runtime differences can be compensated for more easily, in particular when a powerful backup PLC, for example, effects the reserve functionality of a plurality of master PLCs in a time-slice method. In this case, the temporal trailing of a reserve program (slave program) becomes temporarily greater and is then reduced again.

One refinement of the invention provides for the respective master to be used to also transmit process input values to the slave at the time when the current releases are transmitted. The information relevant to the slave is combined or collected and is finally transmitted to the slave. In contrast with known temporal synchronization methods during which relevant information must be immediately transmitted to the slave, this means a considerably reduced amount of "management effort" both for the automation devices provided as master and for the slave or the backup automation device.

Another refinement of the invention provides for the slave to acknowledge the respective release to the respective master after the respective processing sections have been processed. The number of unacknowledged releases makes the respective master aware of the current trailing of the slave, and as a result the respective master can take suitable measures in order to prevent the temporal trailing from becoming too great.

A multi-core-based unit is preferably provided as the backup PLC, each core of the backup PLC being able to be allocated to a master PLC as a redundancy partner. The backup PLC can also be in the form of a powerful industrial PC with an accordingly configured main memory and processing performance. Further advantageous refinements and features emerge from the claimed invention as well.

BRIEF DESCRIPTION OF THE DRAWINGS

The invention, its refinements and advantages are explained in more detail below using the drawing which illustrates an exemplary embodiment of the invention and in which:

FIGS. 1-2 and 6 show redundant automation systems in accordance with some embodiments of the present invention.

The same parts in FIGS. 1-6 are provided with the same reference symbols.

DETAILED DESCRIPTION OF THE PRESENTLY PREFERRED EMBODIMENTS

Reference is made to FIG. 6 which illustrates a redundant automation system that is known in the art and comprises two subsystems. A first subsystem Ta is in the form of a master automation device (master PLC) and a second subsystem Tb is in the form of a slave automation device (backup PLC), and the two subsystems are connected to a peripheral unit Pe via a field bus Fb. In this case, the field bus Fb complies with the PROFIBUS-DP specification, for example. In principle, other bus systems, for example Ethernet, Fieldbus, Modbus, or else parallel bus systems, are also suitable. The peripheral unit Pe receives, via input lines Es, signals from transducers or measuring transducers, which are used to detect a process state, outputs via output lines As, and signals to actuators, which are used to influence the process. The process as well as the transducers, measuring transducers and actuators are not illustrated in FIG. 6 for the sake of clarity. The two subsystems Ta, Tb of the known automation system execute the same control program in a cyclical and synchronous manner. A synchronization connection Sv is provided in order to synchronize the subsystems, and the redundancy and monitoring functions are implemented via this synchronization connection Sv.

Figure 1:
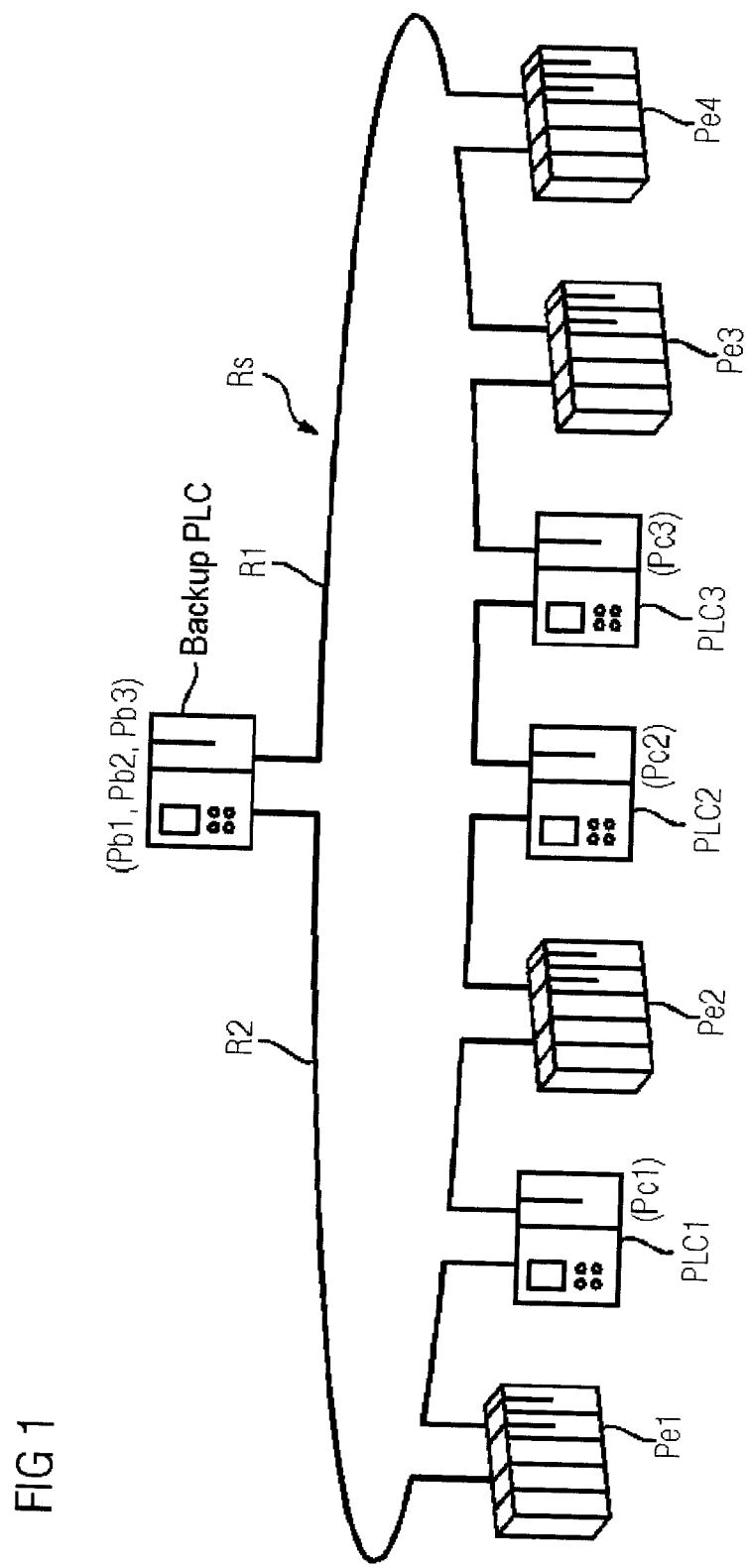
Figure 2:
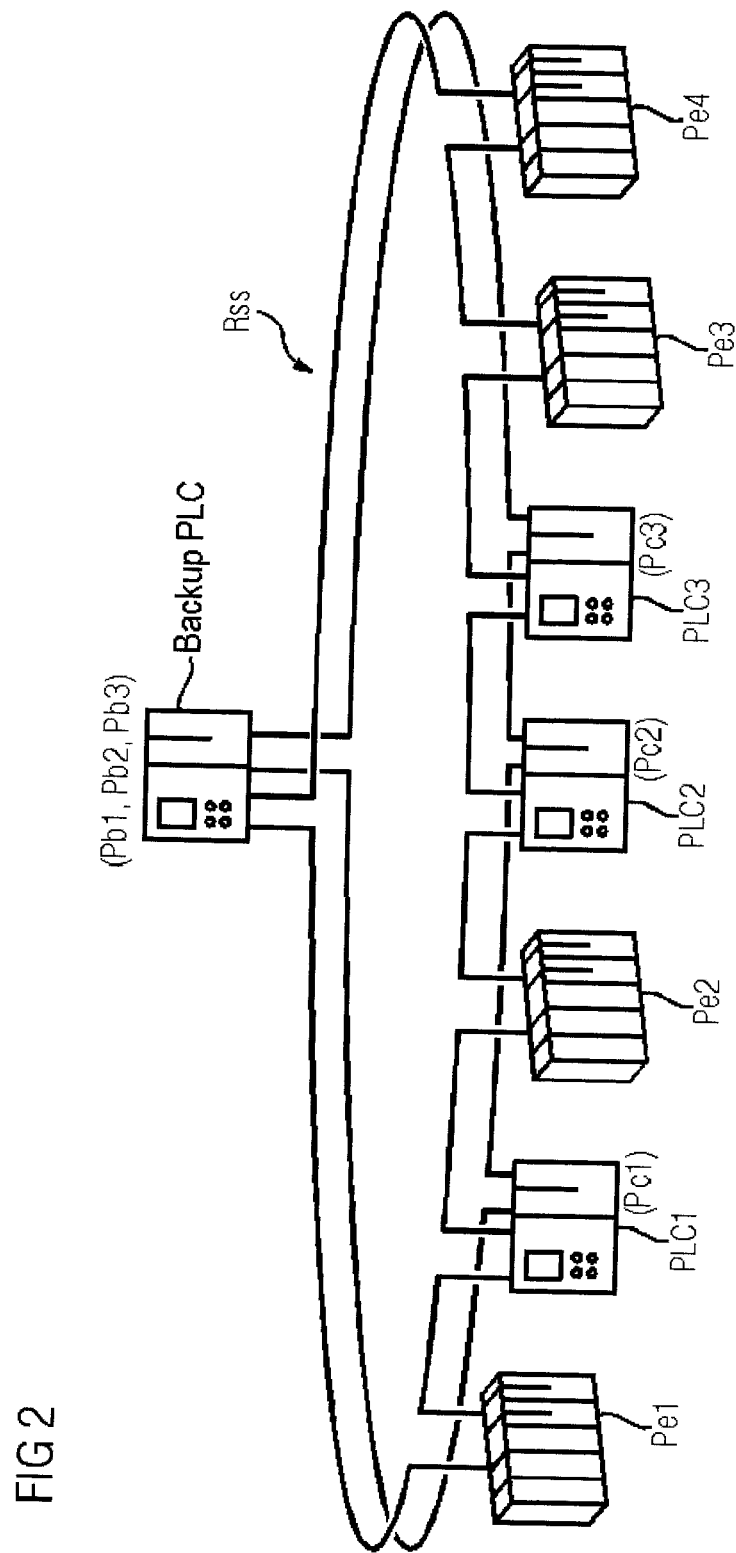

Reference is made below to FIGS. 1-2 which illustrate redundant automation systems. In one embodiment, these automation systems have three master automation devices PLC1, PLC2, PLC3, four peripheral units Pe1, Pe2, Pe3, Pe4 and a slave automation device backup PLC. The automation devices PLC1, PLC2, PLC3, the backup PLC and the peripheral units Pe1, Pe2, Pe3, Pe4 are connected to one another. In this embodiment, a ring structure Rs, which, e.g., uses the PROFINET standard, is provided as the connection. It goes without saying that other network structures or network topologies, such as a bus or star topology as well as a mixed form of these topologies, can be provided in order to implement redundancy.

In order to achieve more powerful coupling of the master automation devices PLC1, PLC2, PLC3 to the slave automation device backup PLC, the automation system according to FIG. 2 has a double-ring structure Rss, and as a result the data required for synchronization can be transmitted separately from the peripheral data and the changeover times in the event of a failover can be shortened, in particular. Each of the three master automation devices PLC1, PLC2, PLC3 processes a control program Pc1, Pc2, Pc3, and the slave automation device backup PLC is configured to process a corresponding slave control program Pb1, Pb2, Pb3 for each master control program Pc1, Pc2, Pc3. This ensures that, if the master automation device PLC1 fails, for example, the slave automation device backup PLC can assume the function of this failed master PLC1. This is because the slave automation device backup PLC processes the slave control program Pb1 corresponding to the master control program Pc1 of the failed master automation device PLC1.

On account of the fact that the master automation device PLC1 has failed, the connection Rs has been interrupted and the slave automation device backup PLC interchanges information with the master automation devices PLC2, PLC3 and the peripheral units Pe2, Pe3, Pe4 via a first section R1 of the connection Rs, but interchanges information with the peripheral unit Pe1 via a second section R2 of the connection Rs.

In order to explain event-synchronous processing of the control programs, reference is made below to FIGS. 3-5 which illustrate sequences of temporally asynchronous coupling of one of the master automation devices PLC1, PLC2, PLC3—referred to as the master M below—and the backup automation device backup PLC—referred to as the slave S below. In this context, "event-synchronous processing" means that both the master and the slave run through the same program paths of the respective control program on account of an event, and the runs are effected in a temporally asynchronous manner.

Figure 3:
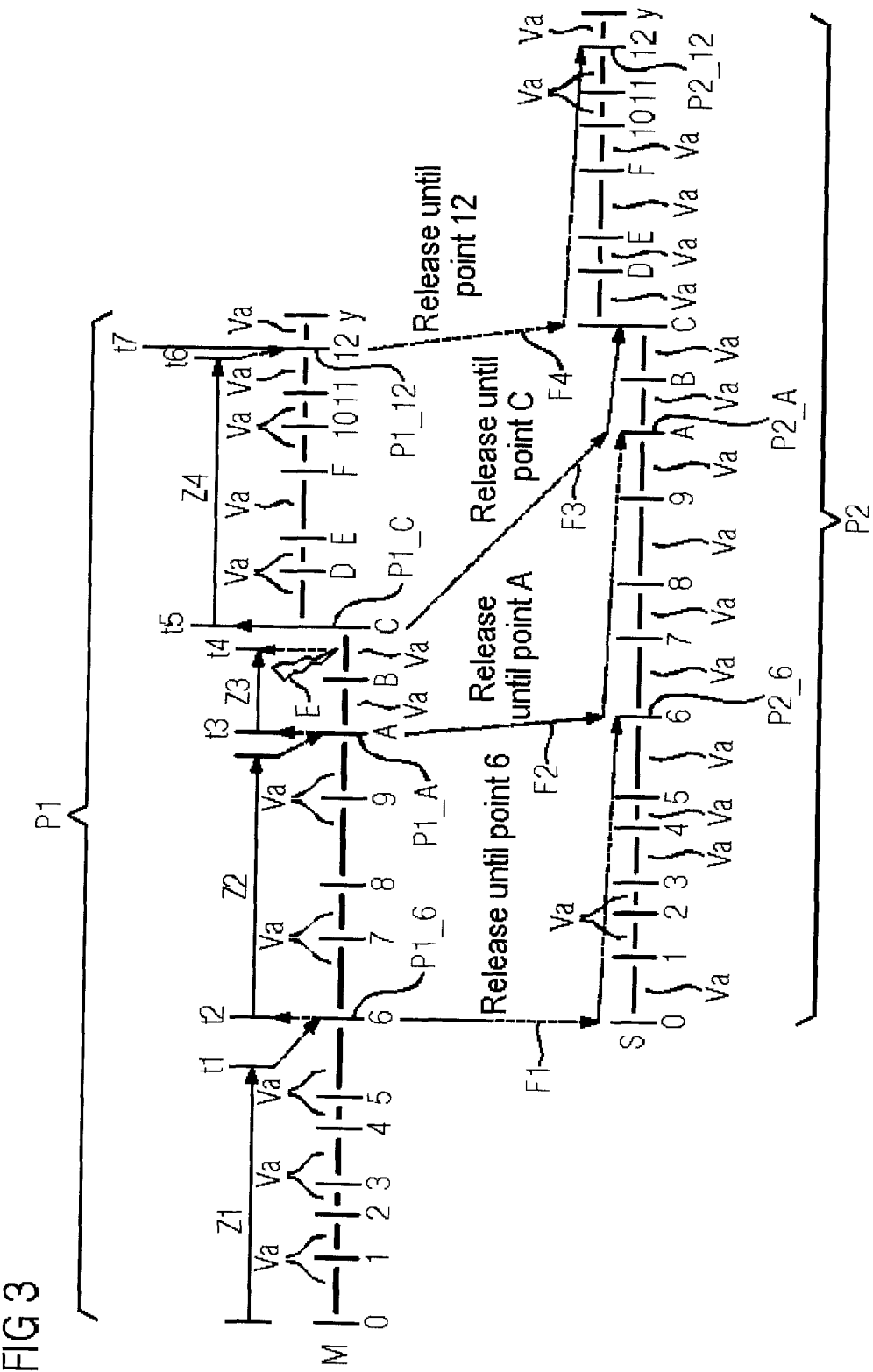
FIGS. 3-5 show sequences of temporally asynchronous coupling of a master and a slave in accordance with some embodiments of the present invention.
Figure 4:
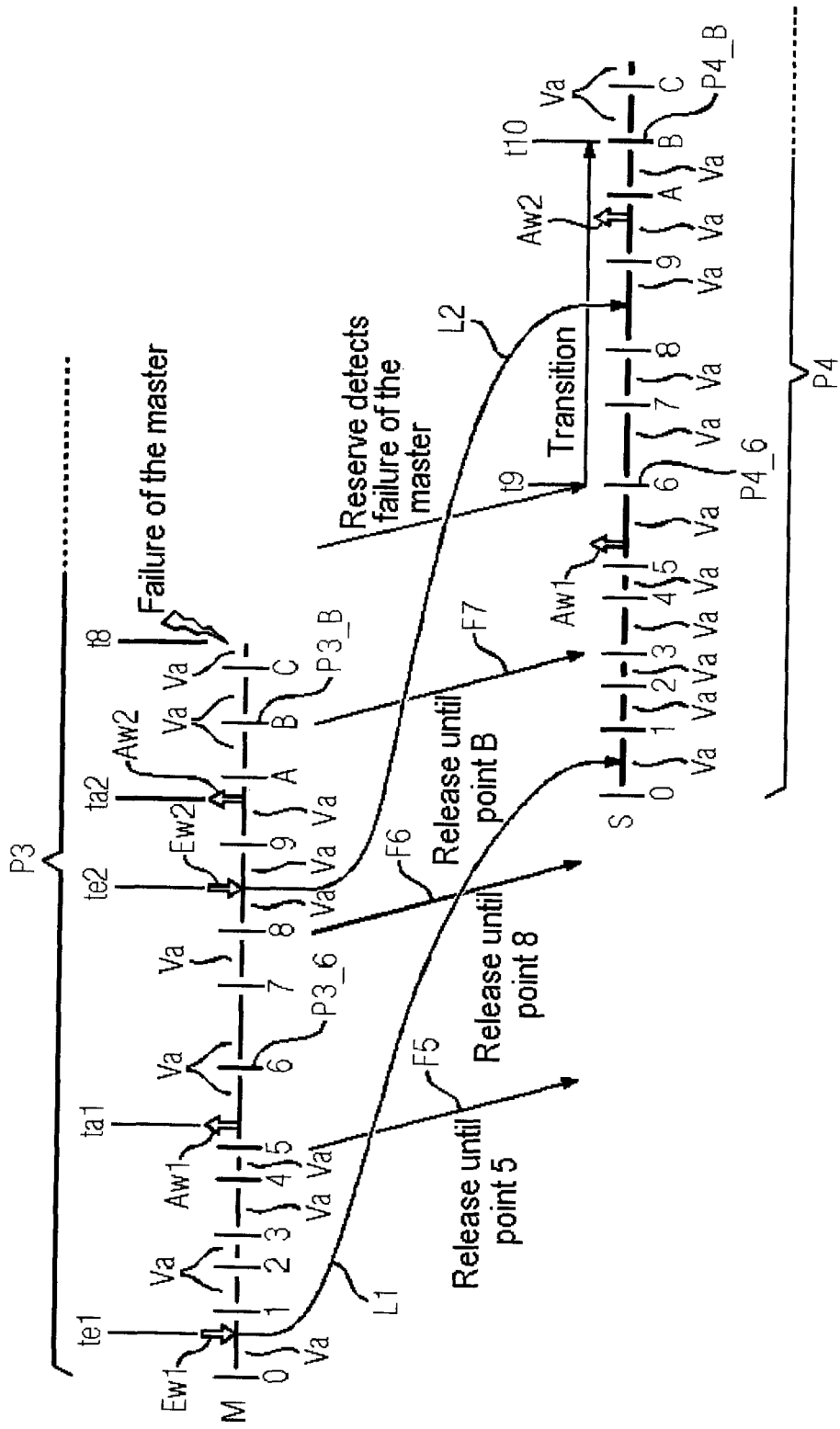
Figure 5:
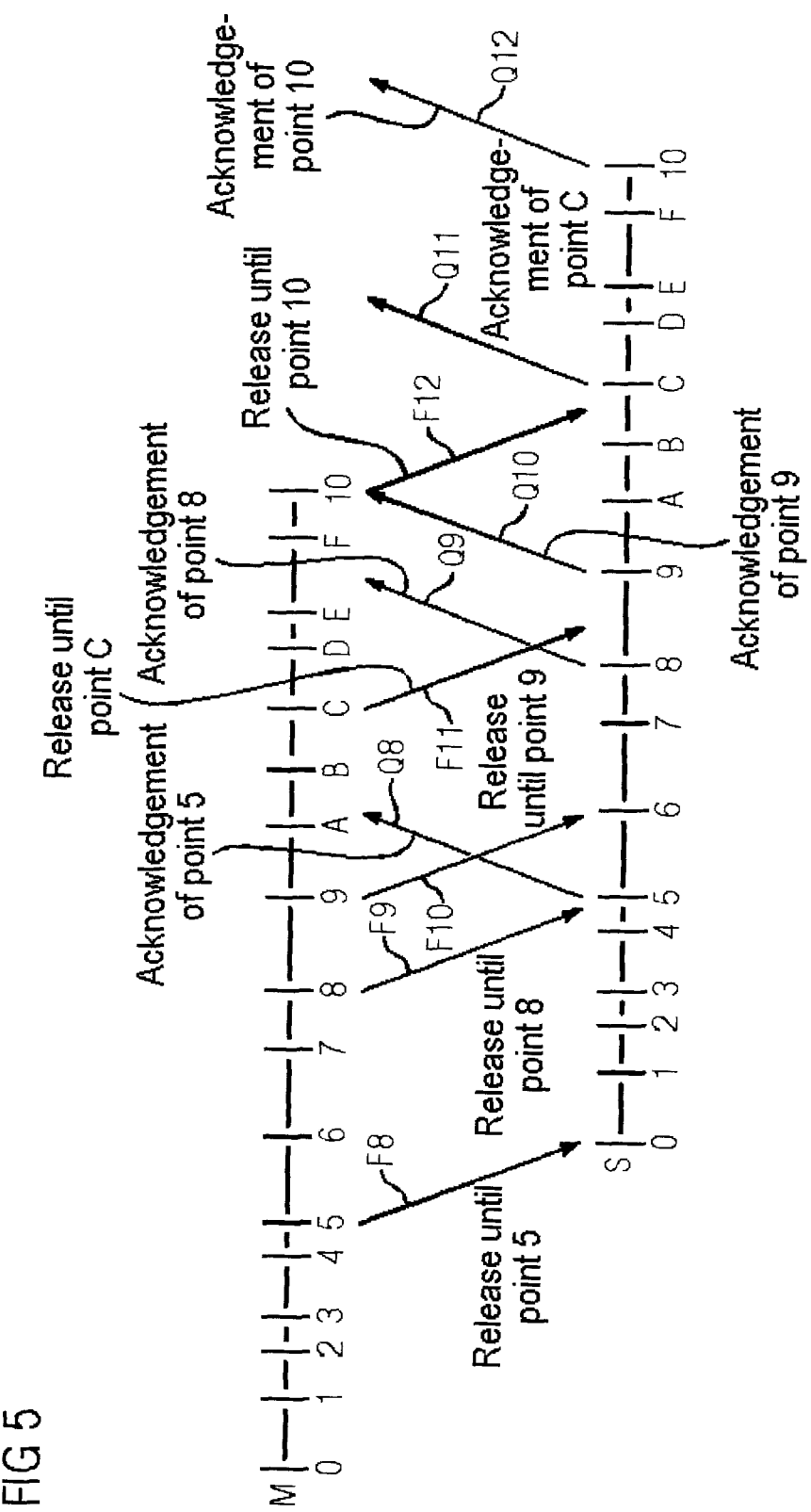

In the embodiments according to FIGS. 3-5, the master M leads with respect to the control of a technical process and undertakes process control, and the master reads the process input information or process input values from one or more of the peripheral units and makes it/them available to the slave S in a temporally asynchronous manner. The slave S assumes the master function or the role of the master only if the master M fails on account of a fault.

The master M processes a program P1 for controlling the technical process, and the slave S also processes a program P2 corresponding to this control program P1. Both control programs P1, P2 have a multiplicity of processing sections (Va) of different duration, and the control programs P1, P2 are interrupted at the respective beginning and the respective end of each processing section Va. The beginning and end of each processing section Va, which usually comprises a multiplicity of program codes, therefore, represent interruptible program points or breakpoints 0, 1, 2, . . . y. If necessary, the respective control program P1, P2 can be interrupted at these points 0, 1, 2, . . . y using the master M and the slave S in order to initiate suitable reactions after an event or a process alarm has occurred.

Furthermore, the respective control program P1, P2 can be interrupted at these breakpoints 0, 1, 2, . . . y so that the master M and the slave S can interchange releases, acknowledgements or other information via the field bus Fb or via the synchronization connection Sv (FIG. 4). After a respective predefinable or predefined interval of time Zi, where i=1, 2, . . . has expired and at the respective time when a breakpoint following the expiry of the respective interval of time Zi occurs, preferably the first breakpoint following the respective interval of time Zi, the master M transmits a release or release signal to the slave S, wherein the release or the release signal indicates to the slave S the processing section Va up to which the slave S can process the control program P2.

These processing sections Va of the control program P2 correspond to those which have already been processed by the master M during the processing of the control program P1. In one embodiment, it is assumed that, after an interval of time Z1 has expired, the master M transmits a release F1 to the slave S at a time t1 and at a time t2 when a first breakpoint P1_6 (breakpoint 6) follows the interval of time Z1. This release F1 comprises the information for the slave S indicating that the latter can process its control program P2 to be processed up to a breakpoint P2_6 (breakpoint 6), wherein the breakpoint P2_6 of the control program P2 corresponds to the breakpoint P1_6 of the control program P1. This means that, on the basis of the release, the slave S can process those processing sections Va of the control program P2 that correspond to the processing sections Va of the control program P1 up to the time at which the release or the release signal is generated. In this case, it is assumed in the example for the sake of simplicity that the time at which the release is generated corresponds to the time at which the release is transmitted to the slave S.

These processing sections Va are, therefore, processed using the slave S in a temporally asynchronous manner with respect to the processing of the corresponding processing sections Va using the master M, and the slave S processes further processing sections Va, after the processing sections Va of the control program P2 have been processed by the slave S, only when the master M transmits a further release to the slave S. The time at which this breakpoint P1_6, P2_6 (breakpoint 6) occurs represents the beginning of an interval of time Z2 following the interval of time Z1.

The further temporally asynchronous processing of the control programs P1, P2 is carried out in the described manner. At a time t3 when a first breakpoint P1_A occurs after the expiry of the interval of time Z2, the master M transmits a further release F2 to the slave S, which release indicates to the slave S that the latter can process further processing sections Va up to the breakpoint P2_A. These processing sections Va again correspond to those which have already been processed by the master M from the time t2 to the time t3, i.e., up to the breakpoint P1_A. This means that the slave S processes the processing sections Va from the time t2 of the previous release F1 to the time t3 of the current release F2. The time t3 when the first breakpoint P1_A has occurred after the expiry of the interval of time Z2 is the beginning of an interval of time Z3 following the interval of time Z2.

An event, for example an event in the form of a process alarm, may now occur during an interval of time. In the exemplary embodiment, E is used to denote such an event to which the master M must react in a suitable manner during the interval of time Z3 at a time t4 in accordance with the control program P1. In this case, the master M does not transmit a release F3 to the slave S at a time when a breakpoint following the interval of time Z3 occurs after the interval of time Z3 but rather at a time t5 when a breakpoint P1_C (breakpoint C) following the occurrence of the event E occurs. This means that the interval of time Z3 is shortened on account of the event E, and the time t5 is the beginning of a following interval of time Z4. On the basis of the release F3 transmitted to the slave S, the slave S processes those processing sections Va of the control program P2 that correspond to those processing sections Va of the control program P1 that have already been processed by the master M between the times t3 and t5.

On account of the event E, the master M processes higher-priority processing sections Va during the interval of time Z4. For example, the master M carries out a thread change at the time t5, and, after the interval of time Z4 has expired at the time t6, again transmits a release F4 at a time t7 when a first breakpoint P1_12 (breakpoint 12) following the interval of time Z4 occurs. On the basis of this release, the slave S likewise processes processing sections Va up to a breakpoint P2_12 (breakpoint 12) in the control program P2, wherein these processing sections Va correspond to the processing sections Va of the control program P1 between the times t5 and t7, and the slave S likewise carries out a thread change.

As explained, the releases from the master M make it possible for the slave S to run through the same "thread mountain" as the master M. This means that the slave S carries out a "thread change" at a point in the control program P2 corresponding to the point in the control program P1. The slave S continues its processing only when requested to do so by the master M using a release. With regard to the processing of the processing sections, the master M processes them in real time like in stand-alone operation or in non-redundant operation and issues releases for corresponding processing sections to be processed by the slave S at regular intervals of time and after the occurrence of events, the master M continuing to process its control program P1 and not actively waiting for a response from the slave S. With regard to the processing of the corresponding processing sections, the slave S trails the master M and processes the sections on the basis of the issued master releases.

Reference is made below to FIG. 4 which illustrates a transition of the role of master from the master M to the slave S. The master M transmits releases F5, F6, F7 to the slave S in the described manner, in which case it is assumed that the master M fails at a time t8.

On the basis of the releases F5 to F7, the slave S processes the processing sections Va of a control program P4 up to a breakpoint P4_B (breakpoint B), wherein these processing sections Va correspond to those processing sections Va of a control program P3 that have been processed using the master M up to the breakpoint P3_B (breakpoint B).

At times te1, te2, the master M has read access to the peripheral unit Pe within the scope of the processing of the control program P3. This means that the master M reads in process input values Ew1, Ew2, processes them in accordance with the control program P3 and generates process output values Aw1, Aw2, which are transmitted to the peripheral unit Pe at times ta1, ta2 by the master M. The master M transmits the process input values Ew1, Ew2 to the slave S (this is indicated in the drawing by means of curved lines L1, L2). The transmission is effected together with the releases F5, F7 in order to avoid increasing the communication load between the master M and the slave S while processing the processing sections Va up to these releases F5, F7.

The slave S likewise processes these process input values Ew1, Ew2 in accordance with the control program P4 and likewise generates the process output values Aw1, Aw2, which are transmitted to the peripheral unit Pe by the slave S. In this case, it is assumed that the peripheral unit Pe is a "switched" peripheral unit having a primary connection and a secondary connection. The primary connection is intended to receive the process output values from the master M and the secondary connection is intended to receive the process output values from the slave S, wherein the slave S changes over the peripheral unit from the primary connection to the secondary connection if the slave S detects that the master M has failed.

As explained, it is assumed that the master M fails at a time t8. The slave S detects the failure, for example by virtue of the fact that the master M has not transmitted any sign of life to the slave S via the synchronization connection Sv or the field bus Fb (FIG. 4) during a predefined duration. After the slave S has detected the failure, for example at a time t9, the slave S does not immediately assume the role of master. This is because the system state of the slave S differs from that of the master M at time t9 and a smooth change or transition is, therefore, impossible.

At this time t9, the slave S has only processed the processing sections Va up to a breakpoint P4_6 (breakpoint 6) and the corresponding processing sections Va of the master M up to a breakpoint P3_6 (breakpoint 6) and, therefore, "lie" in the past. Only after a transition, i.e., after the slave S has processed the processing sections Va released using the release F7 up to the breakpoint P4_B at a time t10, does the slave S assume the role of master and thus the control of the technical process, wherein the slave S changes over the peripheral unit from the primary connection to the secondary connection at time t10.

During this transition, the (previous) slave S still runs through the same thread mountain with path synchronization and processes the same process input values as those processed by the (previous) master M before its failure, wherein the (previous) slave S determines the same process output values as the (previous) master M on the basis of these input values. The transition is ended when the aim of the last release—the processing of the processing sections Va up to the breakpoint P4_B in the present example—has been achieved.

The duration of the transition substantially corresponds to the duration of the temporal trailing at the "failover" time. In order to keep the temporal trailing at a tolerable degree, every release F8 to F12 (FIG. 3) from the master M is then acknowledged by the slave S in an asynchronous manner using respective acknowledgements Q8 to Q12 if the slave S has concluded the respective processing. The master M evaluates the number of unacknowledged releases and determines the current trailing of the slave S therefrom. If the temporal trailing is too high or too long, which may result in a loss of redundancy for example, the master M takes suitable measures in order to reduce the temporal trailing or to avoid it becoming too large.

For example, the master M can suspend or delay the processing of low-priority threads in response to excessive trailing, wherein the processing of the higher-priority threads requires considerably less than 100% of the computation time. The master M, therefore, has fewer processing sections to run through and generates fewer releases, with the result that the slave S can "catch up".

Although the present invention has been described above with reference to presently preferred embodiments, it is not limited thereto but rather can be modified in a wide variety of ways. In particular, the invention can be altered or modified in multifarious ways without departing from the essence of the invention.

What is claimed is:

1. A redundant automation system having a plurality of automation devices which are connected to one another, wherein each of the plurality of automation devices processes a control program in order to control a technical process and wherein at least one of the plurality of automation devices operates as a slave and at least two of these automation devices each operates as a master, the redundant automation system comprising:
   a plurality of master devices, each configured to run a respective master program and to process processing sections of the respective master program of the respective master program; and
   a slave device configured to process a corresponding slave control program for each master control program run by the plurality of master devices and, if one of the plurality of master devices fails, to assume the function of the failed master,
   wherein each of the plurality of master devices is further configured to transmit a master release to the slave device after an event has occurred or after the expiry of a predefined interval of time,
   wherein the master release indicates to the slave device the processing section up to which the slave device can process the slave control program corresponding to the master control program of the failed master device,
   wherein the slave device is further configured to process processing sections of the slave control programs on the basis of the master releases,
   wherein the processing sections correspond to those processing sections of the master control programs that have already been processed from previous master releases to the current master releases.

2. The redundant automation system of claim 1, wherein the slave device is further configured to acknowledge the respective master release to the respective master device after the respective processing sections have been processed.

3. The redundant automation system of claim 1,
wherein the automation system is configured to provide breakpoints in the master control program using the respective master device and in the slave control programs using the slave device at the beginning and end of the respective processing section, respectively,
wherein the respective master device is configured to provide as the beginning of an interval of time following the respective interval of time one of (1) the time at which a breakpoint following the respective interval of time occurs and (2) the time at which a breakpoint following the occurrence of the event occurs, and
wherein the respective master device is further configured to transmit the master release to the slave device at the time mentioned in (1) or (2) above.

4. The redundant automation system of claim 1, wherein the respective master device is further configured to transmit process input values to the slave device at the time when the master release is transmitted.

5. The redundant automation system of claim 1, wherein the master devices and the slave device are coupled to one another via one of bus topology, ring topology, star topology and a mixed foam of any of bus, star, and ring topologies.

6. The redundant automation system of claim 1, wherein the connection is redundant.

7. The redundant automation system of claim 1, wherein the slave device is a multi-core-based or PC-based unit.

8. A slave device for a redundant automation system of claim 1, wherein the redundant automation system is provided with a plurality of automation devices which are connected to one another, wherein each of the plurality of automation devices processes a control program in order to control a technical process, and wherein one of the plurality of automation devices operates as a slave device and at least two of the plurality of automation devices, each operates as a master device, wherein the slave device is configured to:
process a corresponding slave control program for each master control program run by respective master device and, if one of the master devices fails, to assume the function of the failed master device; and
to process processing sections of the slave control programs on the basis of the master releases, wherein the processing sections correspond to those processing sections of the master control programs that have already been processed from previous master releases to the current master releases.

* * * * *